US 10,908,023 B2

(12) United States Patent
Hunter et al.

(10) Patent No.: US 10,908,023 B2
(45) Date of Patent: Feb. 2, 2021

(54) SPATIAL HETERODYNE SPECTROMETER

(71) Applicant: LightMachinery Inc., Nepean (CA)

(72) Inventors: John H. Hunter, Almonte (CA); Ian J. Miller, Ottawa (CA); Hubert Jean-Ruel, Ottawa (CA); Edward S. Williams, Kanata (CA)

(73) Assignee: LightMachinery Inc., Nepean (CA)

( * ) Notice: Subject to any disclaimer, the term of this patent is extended or adjusted under 35 U.S.C. 154(b) by 0 days.

(21) Appl. No.: 16/503,885

(22) Filed: Jul. 5, 2019

(65) Prior Publication Data

US 2021/0003450 A1     Jan. 7, 2021

(51) Int. Cl.
| | |
|---|---|
| *G01J 3/453* | (2006.01) |
| *G01J 3/18* | (2006.01) |
| *G01J 3/22* | (2006.01) |
| *G01J 3/12* | (2006.01) |

(52) U.S. Cl.
CPC ............. *G01J 3/4531* (2013.01); *G01J 3/189* (2013.01); *G01J 3/22* (2013.01); *G01J 2003/1208* (2013.01)

(58) Field of Classification Search
CPC ...... G01J 3/189; G01J 3/22; G01J 3/45; G01J 3/4531; G01J 2003/1208; G01J 2003/451
See application file for complete search history.

(56) References Cited

U.S. PATENT DOCUMENTS

| | | |
|---|---|---|
| 7,330,267 B1 | 2/2008 | Weitzel |
| 7,535,572 B2 | 5/2009 | Englert |
| 7,773,229 B2 | 8/2010 | Harlander et al. |
| 2009/0231592 A1* | 9/2009 | Harlander ............ G01J 3/4532 356/456 |
| 2013/0188181 A1* | 7/2013 | Angel .................. G01N 21/65 356/301 |

(Continued)

FOREIGN PATENT DOCUMENTS

CN     108344508 A    *  7/2018

OTHER PUBLICATIONS

Liu, Jilin et al. "Effective wind and temperature retrieval from Doppler asymmetric spatial heterodyne spectrometer interferograms". Applied Optics. vol. 57, No. 30, Oct. 20, 2018, pp. 8829-8835. (Year: 2018).*

(Continued)

*Primary Examiner* — Michael A Lyons
(74) *Attorney, Agent, or Firm* — Stratford Managers Corporation

(57) ABSTRACT

A conventional spatial heterodyne spectrometer (SHS) comprises a beam splitter and a pair of diffraction gratings, one in each arm of the SHS. The beam splitter separates an input beam of light into first and second sub-beams for transmission to a respective diffraction grating, and then recombines the diffracted sub-beams for focusing onto a camera. A field widened SHS enables much larger range of input angles of the original beam to be focused onto the camera, so that a broader range of wavelengths may be collected. Increasing the range of wavelengths may be provided by one or more of the following: combining the beam splitter with a field widening prism, making one diffraction grating farther from the beam splitter than the other, and placing a plurality of diffraction gratings in each arm of the SHS.

20 Claims, 12 Drawing Sheets

(56) References Cited

U.S. PATENT DOCUMENTS

2014/0029004 A1* 1/2014 Bodkin ............... G01J 3/02
356/328
2014/0247447 A1* 9/2014 Angel ............... G01N 21/65
356/301

OTHER PUBLICATIONS

Harlander, J. et al. "Spatial Heterodyne Spectroscopy for the Exploration of Diffuse Interstellar Emission Lines at Far-Ultraviolet Wavelenghts". The Astrophysical Journal, 396:730-740, Sep. 10, 1992. (Year: 1992).*

Liu, Jilin et al. "Analysis and correction of distortions in a spatial heterodyne spectrometer system". Applied Optics, vol. 58, No. 9, Mar. 20, 2019, pp. 2190-2197. (Year: 2019).*

Liu, Jilin et al. "Backscattering Raman spectroscopy using mutligrating spatial heterodyne Raman spectrometer". APplied Optics, vol. 57, No. 33, Nov. 20, 2018, pp. 9735-9745, (Year: 2018).*

Harlander et al., "Robust monolithic ultraviolet interferometer for the SHIMMER instrument on STPSat-1", Applied Optics, vol. 42, No. 15, pp. 2829-2834, May 20, 2003.

Perkins, "Spatial Heterodyne Spectroscopy: Modeling and Interferogram Processing", B.S. Merrimack College, 2011, Thesis submitted for M.S. Degree in Imaging Science, Chester F. Carlson Center for Imaging Science, College of Science, Rochester Institute of Technology, Rochester, New York, Jul. 29, 2013.

* cited by examiner

Figure 4

SPATIAL HETERODYNE SPECTROMETER

TECHNICAL FIELD

The present invention relates to a Fourier transform spectrometer, and in particular to a spatial heterodyne spectrometer with a large spectral range.

BACKGROUND

A Spatial Heterodyne Spectrometer (SHS) is a type of Fourier Transform Spectrometer without moving parts, which combines a very high sensitivity with a very robust mechanical design. A conventional SHS 1, as illustrated in FIG. 1, comprises a beam splitter 2 and a pair of diffraction gratings 8a and 8b, one in each arm of the SHS, separated from the beam splitter 2 by an air gap 9a and 9b. A beam of light 3 is launched into the beam splitter 2, separated into two sub-beams 4 and 6, each of which is directed at one of the diffraction gratings 8a and 8b. Each sub-beam 4 and 6 is reflected back by the respective diffraction grating 8a and 8b with each of the constituent wavelengths directed at a different angle. The two sub-beams 4 and 6 are then directed back to the beam splitter 2 and then through a lens 13, which focuses the two sub-beams onto a camera 14, i.e. an array of pixels, to form a linear fringe pattern, whose spacing is determined by the wavelength difference from a reference wavelength, i.e. the heterodyne wavelength. A Fourier transform is performed on the resulting pattern to determine the location of the constituent wavelengths relative to the heterodyne wavelength, and a conversion shift is performed to determine the specific wavelengths.

A drawback of conventional SHS's is that the contrast of the fringes away from the center of the instrument, i.e. the lens, degrades in the image on the camera 14. Accordingly, field widening prisms 7a and 7b, comprised of a higher refractive index material than the air gaps, making it possible to focus an image from across both gratings 8a and 8b onto the camera 14. Spacers 11 extending from opposite sides and opposite ends of the field widening prisms 7a and 7b are used to connect the field widening prisms 7a and 7b between the beam splitter 2 and the gratings 8a and 8b. Unfortunately, positioning the prisms 7a and 7b within the air gap increases complexity and decreases robustness.

Another configuration, which increases the resolution of an SHS includes arms with two much different lengths, whereby the path difference between the two arms is so large that there is no longer a point in the fringe pattern within the instrument aperture which corresponds to zero path difference. Unfortunately, without a zero path difference point, a full spectrum of wavelengths cannot be recovered, only specific spectral emission lines, because there is no reference point from which to calculate the individual wavelengths.

Another issue with SHS is that the range of wavelengths which can be analyzed with a single instrument is limited by the number of elements in the detecting camera. So for a camera, n pixels wide, fringe frequencies up to n/2 can be uniquely identified. This is known as the Nyquist limit. One well known trick is to tilt one of the gratings, generating two sets of fringes at an angle to each other, and then do a 2D Fourier transform on both sets of fringes, which enables separation of wavelengths on either side of the heterodyne wavelength. Unfortunately, the 2D Fourier transform SHS devices require a much larger math overhead, and results in a much poorer noise performance.

An object of the present invention is to overcome the shortcomings of the prior art by providing a robust SHS with high resolution and larger spectral range.

SUMMARY OF THE INVENTION

Accordingly, the present invention relates to a spatial heterodyne spectrometer (SHS) comprising:
an input for launching an input beam of light;
a beam splitter for separating the input beam of light into first and second sub-beams, and directing the first and second sub-beams along first and second paths, respectively;
a first field-widening prism in the first path for deflecting the first sub-beam;
a second field-widening prism in the second path for deflecting the second sub-beam;
a first diffraction grating in the first path for diffracting the first sub-beam into constituent wavelengths, each travelling back to the beam splitter at a different angle;
a second diffraction grating in the second path for diffracting the second sub-beam into constituent wavelengths, each travelling back to the beam splitter at a different angle;
a camera for recording a fringe pattern created by interference of the first and second diffracted sub-beams; and
a controller for determining a spectrum of the input beam from the fringe pattern;
wherein the first and second diffraction gratings include a same Littrow wavelength providing a heterodyne wavelength creating a zero-path element within the fringe pattern.

BRIEF DESCRIPTION OF THE DRAWINGS

The invention will be described in greater detail with reference to the accompanying drawings which represent preferred embodiments thereof, wherein:

FIG. 4 illustrates a fringe pattern, an intensity response, and a spectrum provided by an SHS in accordance with the present invention;

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
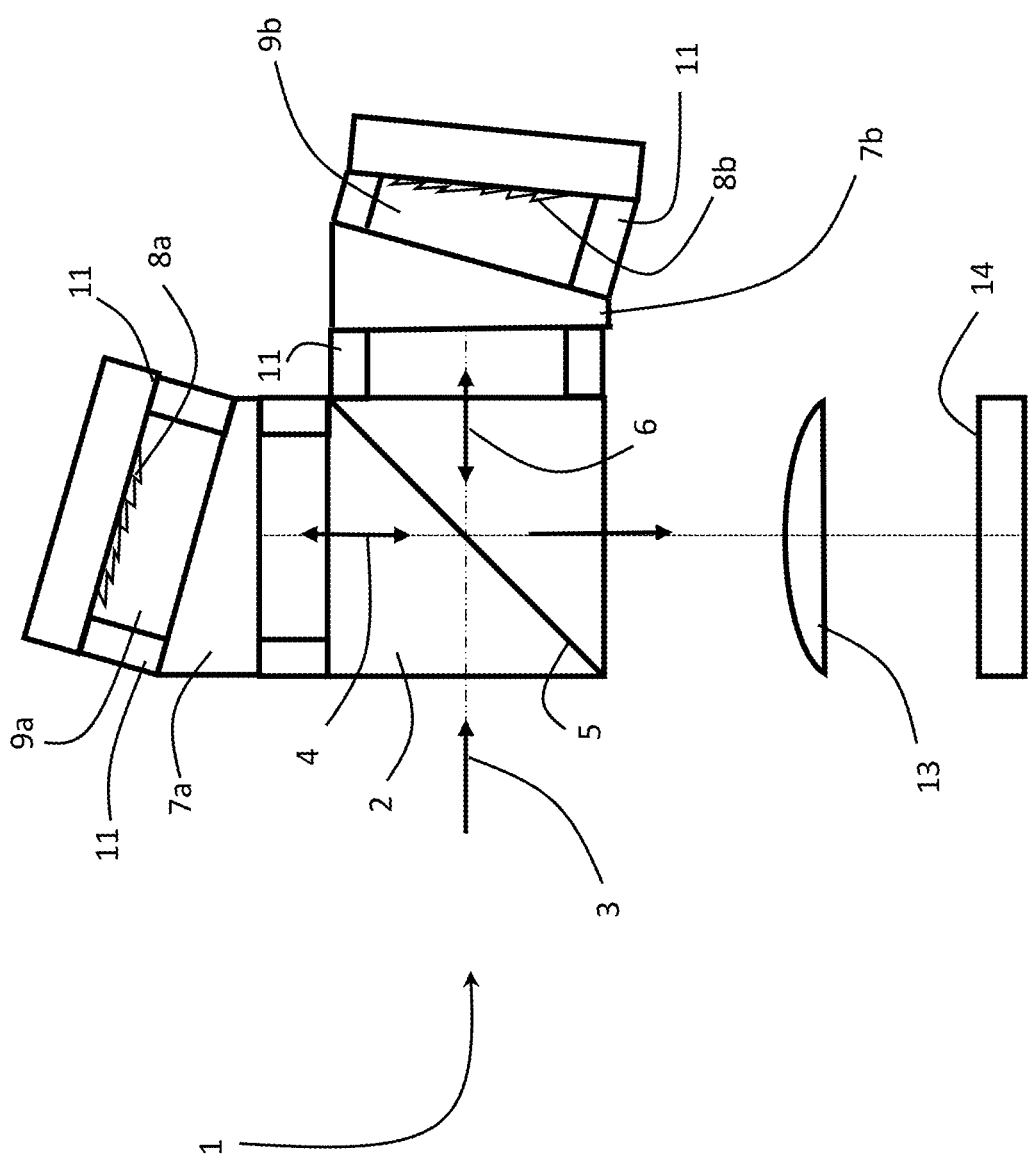
FIG. 1 is a schematic diagram of a conventional SHS.
Figure 2:
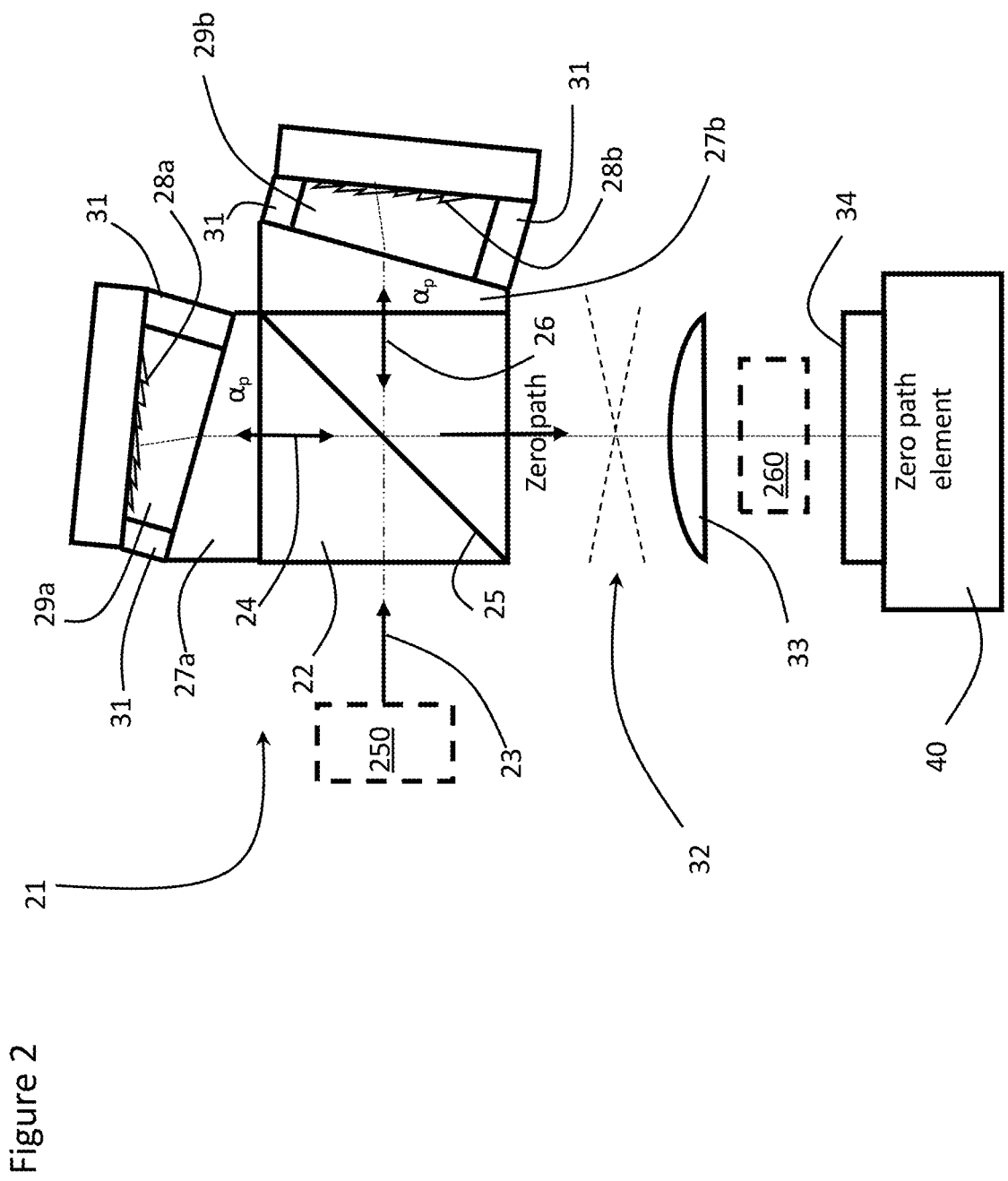
FIG. 2 is a schematic diagram of an SHS in accordance with an embodiment of the present invention.

With reference to FIG. 2, a field widened SHS 21, in accordance with an embodiment of the present invention includes a beam splitter 22 for separating an input beam of light 23 into first and second sub-beams 24 and 26. Field widening means that a much larger range of input angles of the original beam may be focused onto the camera 34 with the field widening prisms 27a and 27b, so more light may be collected, and either fainter sources may be evaluated, or shorter exposure times are necessary with the camera 34. In the illustrated embodiment the beam splitter 22 comprises a beam splitter cube including two triangular prisms, comprised of optically transparent material, e.g. glass, with a beam splitting, e.g. 50/50 percentage of the input beam, partially reflective layer 25 therebetween, but other prisms shapes and partially reflective layers are possible. Each arm of the SHS 21 includes a field widening prism 27a or 27b, and a diffraction grating 28a or 28b, separated from the field widening prism 27a or 27b by an air gap 29a or 29b, defined by spacers 31. The field widening prisms 27a and 27b may be comprised of the same material as the beam splitter 22 or of some other material with a refractive index providing the desired angle of refraction as the sub-beams 24 and 26 exit therefrom and re-enter therein. The diffraction gratings 28a and 28b may be tilted at the Littrow angle to the light, whereby a selected Littrow wavelength $\lambda_L$ is directed back, i.e. retroreflected, in the opposite direction. The air gaps 29a and 29b may be comprised of air or some other gas or material with a refractive index providing the desired angle of refraction as the sub-beams 24 and 26 enter therein and exit therefrom.

The wedge angle of the prisms 27a and 27b are selected so that the sum of D/n (distance/refractive index) is constant across the width of the gratings 28a and 28b. The distance between the beam splitter 22 and the gratings 28a and 28b for all of the rays is not constant because of the angle the gratings 28a and 28b are tilted relative to the output face of the beam splitter 22, but the longest path goes through more glass, i.e. at the thick part of the prism 27a and 27b, and the refractive index of the prism 27a and 27b is higher than the air so D/n balances. This condition ensures that the full width of the gratings 28a and 28b may be in perfect focus by ensuring the optical path length ($D_{air}/n_{air}+D_{prism}/n_{prism}$) is constant across the gratings 28a and 28b for all of the light.

The wedge angle $\alpha_p$ of the prisms 27a and 27b depends on the prism's refractive index, the groove density, i.e. spacing d, of the gratings 28a and 28b and the selected Littrow wavelength $\lambda_L$.

According to the grating equation:
$$\sin(\theta i)+\sin(\theta o)=m\lambda/d \quad (1)$$

Figure 3:
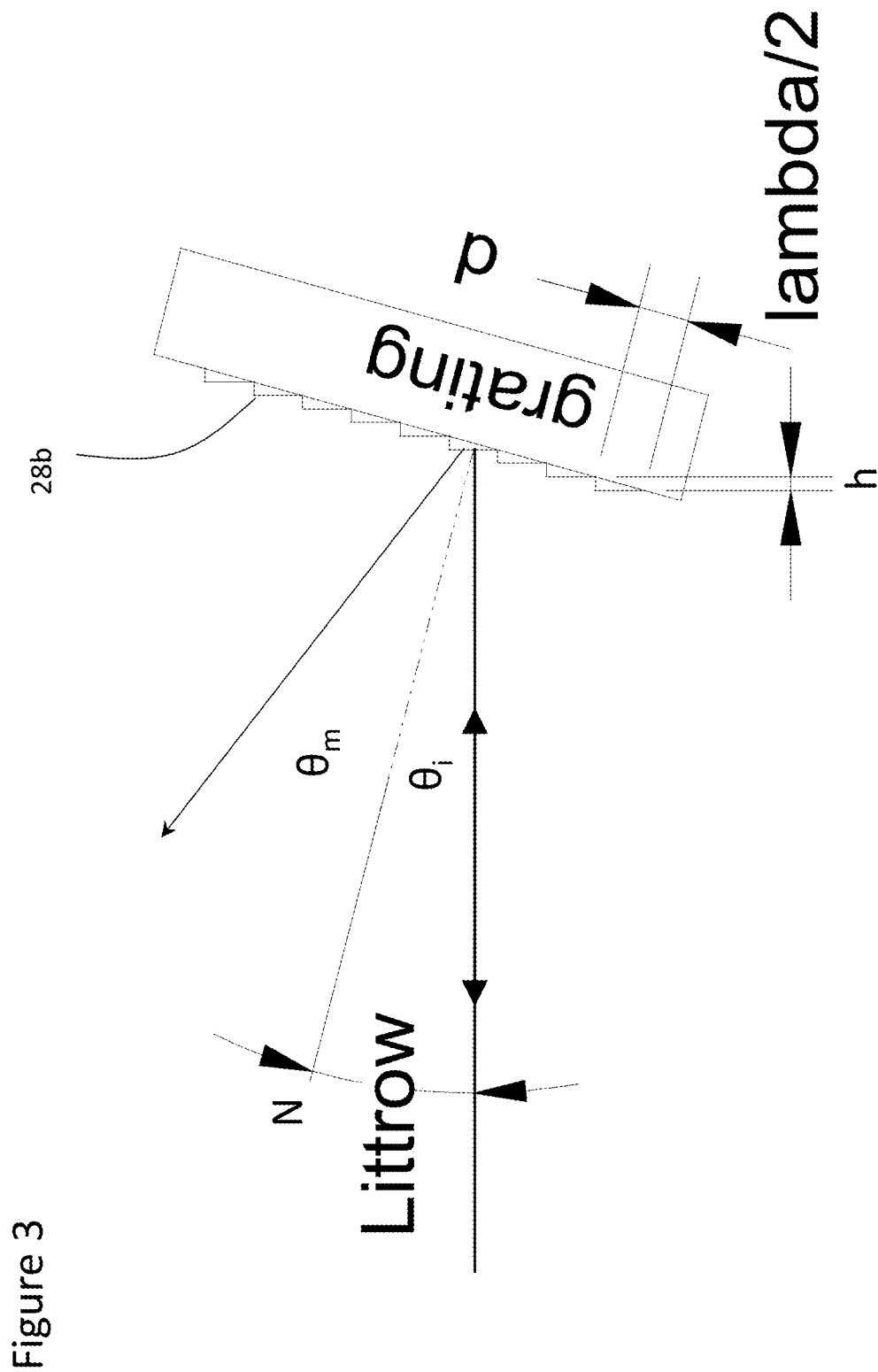
FIG. 3 illustrates a diffraction grating in accordance with the SHS of FIG. 2.

With reference to FIG. 3, d is the spacing between the grooves on the grating 28a or 28b, $\theta_i$ is the incident angle from the normal N, and $\theta_m$ is the diffracted angle from the normal N, m is the diffraction order, $\lambda$ is the wavelength. At the Littrow wavelength $\lambda_L$, the incident and diffracted angles have the same magnitude, and the diffracted light is retroreflected, i.e. $2\sin(\theta_L)=m\lambda/d$ At the Littrow wavelength $\lambda_L$, the step h between the grating grooves is exactly half the Littrow wavelength $\lambda_L/2$. Accordingly, in an SHS spectrometer, at the Littrow wavelength $\lambda_L$, all of the diffracted light constructively interferes because the round trip difference is always an integer multiple of the wavelength $\lambda_L$, and the intensity pattern at the camera 34 is constant, whereby the Littrow wavelength $\lambda_L$ is the heterodyne wavelength. As the wavelength, e.g. $\lambda_i=\lambda_L\pm\Delta\lambda$, varies from the Littrow wavelength $\lambda_L$, the diffracted angle changes, but more importantly, the step height h remains unchanged, whereby it is no longer an integer multiple of the wavelength $\lambda_i$. So the result is an interference, i.e. fringe, pattern whose spacing is proportional to the distance from the heterodyne (or Littrow) wavelength $\lambda_L$.

For a given grating 28a and 28b, the tilt of the grating is determined by the desired heterodyne wavelength $\lambda_L$, i.e. to adjust the angle of incidence i.e. $\theta_i=\theta_L$. The heterodyne wavelength $\lambda_L$ is selected based on the characteristics of the spectrum that is going to be evaluated. Accordingly, for a spectrum between 550 nm and 700 nm, e.g. for Raman spectroscopy excited by a 532 nm laser, a heterodyne wavelength within 20-40 nm of the minimum or maximum range value, e.g. close to 530 nm, may be selected. However, if wavelengths in the 810 nm to 920 nm range are to be evaluated, a heterodyne wavelength $\lambda_L$ of 800 nm may be selected instead, depending on diffraction grating availability etc.

Once the grating specifications (d) and heterodyne wavelength $\lambda_L$ are selected, the required tilt of the grating ($\theta_i$ or $\theta_L$) may be calculated, and then if field widening prisms 27a and 27b are required, calculate the prism wedge apex angle $\alpha_p$.

Instead of mounting the field-widening prisms 27a and 27b within the air gap with hollow spacers on each side thereof, the field-widening prisms 27a and 27b are mounted directly on the beam splitter 22. This configuration includes fewer components, and is therefore, simpler and less expensive to manufacture, but does not have quite as much design flexibility because the field-widening prisms 27a and 27b are fixed to the beam splitter 22, and the ability to rotate the field-widening prisms 27a and 27b relative to the axis of the instrument is lost. However, the total path length from the input face of the beam splitter 22 to the gratings 28a and 28b is reduced, which reduces the size of the SHS 21, and/or increases the accessible field of view, i.e. particular wavelengths at the outer edges of the range which would normally be lost because their angle of diffraction is too large will now be captured by the beam splitter 22.

As each sub-beam 24 and 26 exits the field-widening prisms 27a and 27b, the sub-beams 24 and 26 are refracted at the desired angle of diffraction, whereby each sub-beam 24 and 26 impacts their respectively diffraction grating 28a and 28b at a preferred angle of incidence. Each constituent wavelength, other than the Littrow or heterodyne wavelength, in each sub-beam 24 and 26 is diffracted at a different angle off of the respective diffraction grating 28a and 28b back across the air gap 29a and 29b, through the field-widening prism 27a and 27b, to the beam splitter 22

Figure 4:
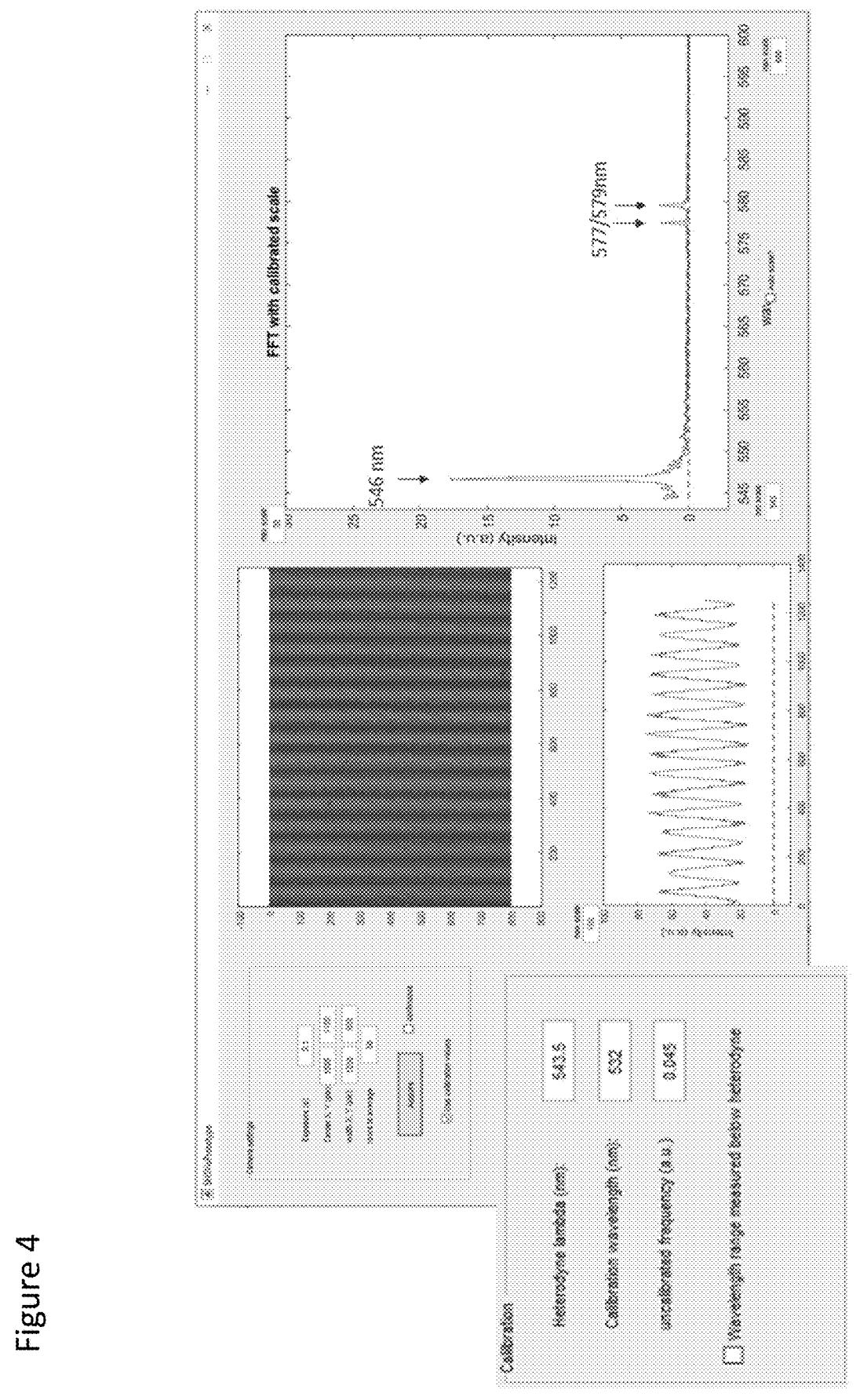

After the reflections of the sub-beams 24 and 26 from the gratings 28a and 28b recombine in the beam splitter 22, the lens 33 focuses the reflected sub-beams 24 and 26 onto the camera 34 creating an interference, i.e. fringe, pattern 32 on the camera 34, see FIG. 4. The fringes are localized at the plane of the gratings 28a and 28b, whereby the lens 33 images the plane of the gratings 28a and 28b onto the camera 34, i.e. focal length of lens 33 is distance from lens 33 to center of the gratings 28a and 28b. The interference pattern may be a uniformly spaced sinusoidal pattern which is proportional to the difference between the test wavelengths $\lambda_1$, $\lambda_2$ . . . and the Littrow wavelength $\lambda_L$. The sinusoidal pattern may be a combination of a plurality of uniformly space sinusoidal patterns created by a plurality of test wavelengths.

The gratings 28a and 28b provide a uniform series of steps, so when you look into the spectrometer 21 you see a series of path differences between the two sub-beams 24 and 26. The intensity pattern for each path difference is determined by the sum of the intensities for all of the wavelengths incident on the interferometer. When a Fourier transform of the measured intensity is performed by a controller 40, provided with the spectrometer 21 or from a remote computer, for all of the different steps, an input spectrum may be recovered. The controller 40 may then determine the absolute wavelengths of the test wavelengths $\lambda_1$, $\lambda_2$ . . . by converting the distance of the individual test wavelengths $\lambda_1$, $\lambda_2$ . . . from the Littrow wavelength $\lambda_L$ depending on the scale provided by the spectrometer 21 and the controller 40. When the path difference is zero, all wavelengths will constructively interfere, so a zero path element or line shows up on the camera 34 as a bright line, if there are a range of input frequencies or wavelengths. If there is only a single input wavelength, the zero path line will not be obvious.

Figure 5:
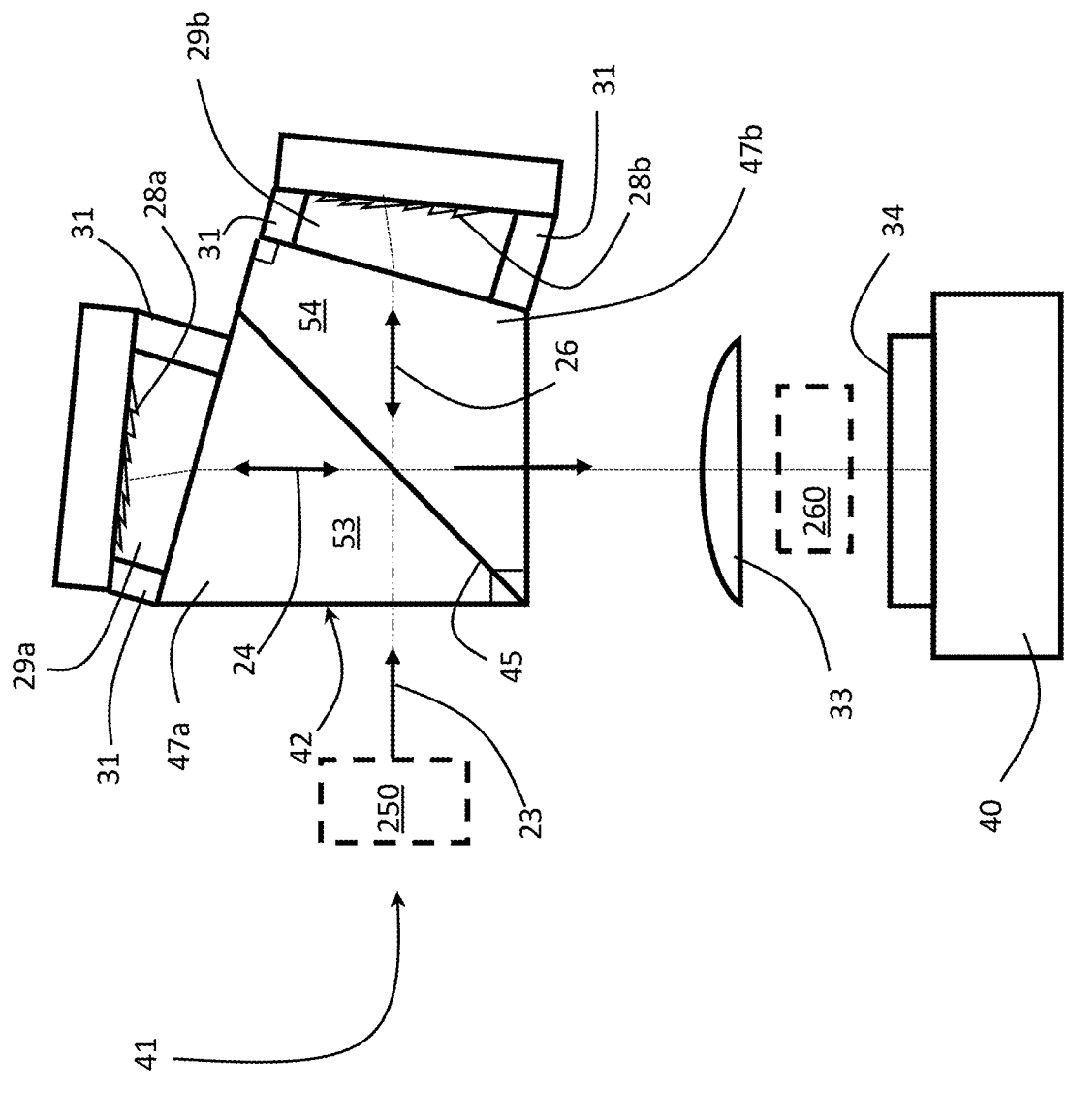
FIG. 5 is a schematic diagram of an SHS in accordance with another embodiment of the present invention.

With reference to FIG. 5, an SHS 41, in accordance with another embodiment of the present invention, includes an integrated (non-cubic) beamsplitter/field-widening prism 42, which includes a monolithic triangular prism 53 incorporating the field-widening prism 47a, and a monolithic quadrilateral prism 54 incorporating the field-widening prism 47b, with a beam splitting, e.g. 50/50 percent intensity, partially reflective layer 45 therebetween. The remaining elements of the SHS 41 are similar to and identified with identical reference numbers as those in FIG. 2, relating to the SHS 21.

The integrated beam splitter 42 may include two edges forming 90° angles with each other, in opposite corners thereof. One 90° angle may be formed at the juncture of an input face of the triangular prism 53 and an output face of the quadrilateral prism 54. Another 90° angle may be formed in the quadrilateral prism 54 between a surface of the quadrilateral prism 54 coplanar with a surface of the triangular prism 53 forming a first input/output surface optically coupled to the first air gap 29a, and another surface of the quadrilateral prism 54 forming a second input/output surface optically coupled to the second air gap 29b. The other angles, i.e. defining wedge angles of field-widening prisms 47a and 47b, in the integrated beam splitter 42 are chosen to give optimized field widening for a wavelength in the region of interest, as hereinbefore discussed. One drawback of this design is that for each different wavelength range, the SHS 41 would need a different integrated beam splitter 42, as the field widening angle may be different.

The beam splitter 21 or 41 in either case may be based on other angles of incidence on the beam splitting layer 25 or 45, for example 30°-60°, instead of 45°. A further manufacturing advantage of the integrated beam splitter 42 is that the vertex of the field widening prisms 47a and 47b may have zero thickness because they are never free standing.

Figure 6:
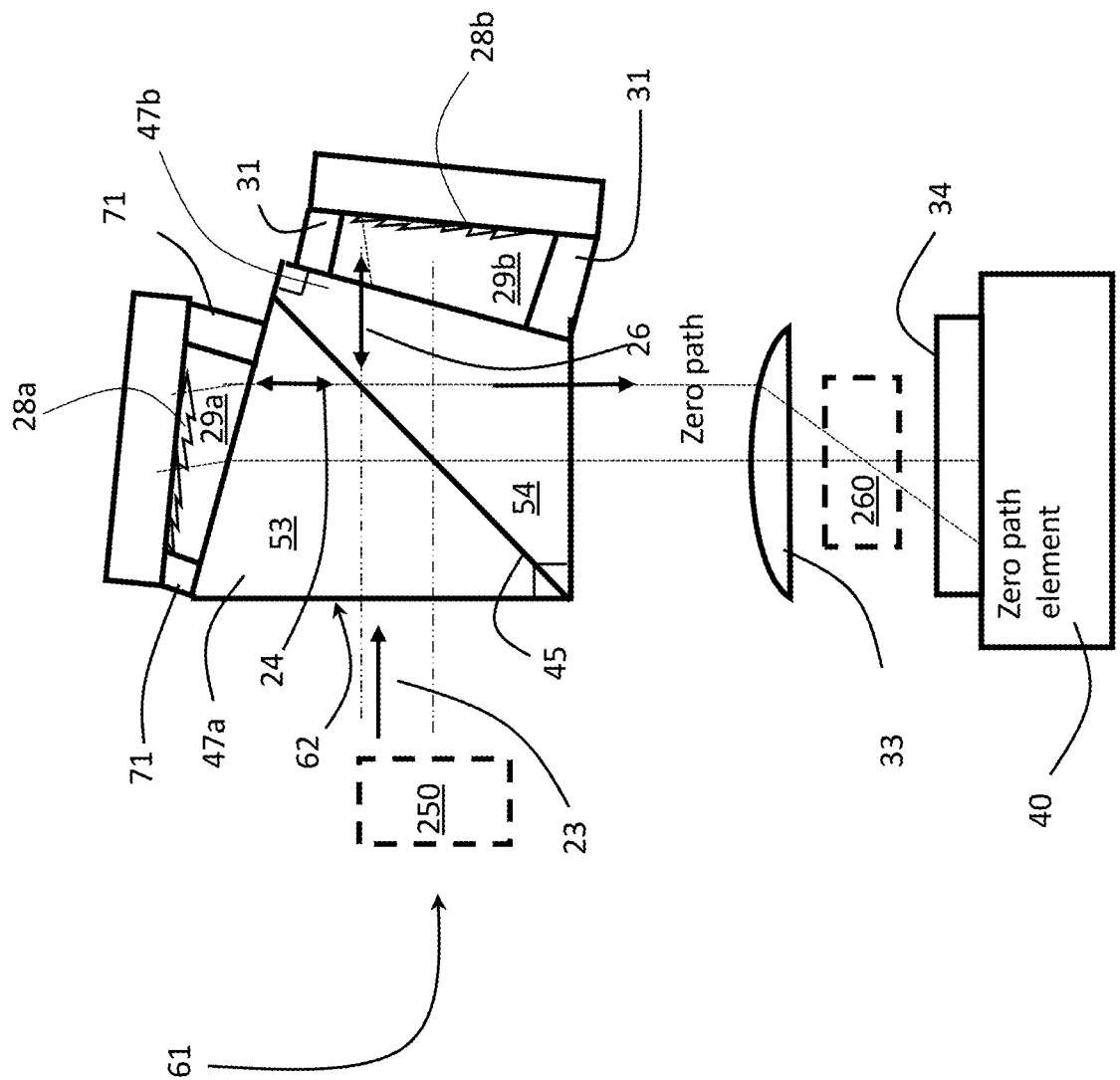
FIG. 6 is a is a schematic diagram of an SHS including different arm lengths in accordance with another embodiment of the present invention.

With reference to FIG. 6, in another embodiment of the present invention, a SHS 61 comprises a similar structure to either SHS 21 or SHS 41, but with different arm lengths, i.e. the distance from the partially reflective surface 25 or 45 to the first diffraction grating 28a is different than the distance from the partially reflective surface 25 or 45 to the second diffraction grating 28b. The zero path line should still be within the aperture of the camera 34, so the phase difference between the two arms should not exceed 2×, e.g. preferably between 1.5× and 2.0×, otherwise the zero path line will not be within the aperture of the camera 34. The arm length difference may be provided for by making one of the prisms 53 or 54 in the beam splitter 62 wider than the other, and/or by providing spacers 71 in the first (or second) arm shorter than spacers 31 in the second (or first) arm, making the distance across the air space 29a shorter than across the air space 29b. Ideally, the step from each arm or grating 28a and 28b, which corresponds to the zero path difference (phase) has the same ratio of air to glass, and the same total thickness, so that it can be field widened.

For embodiments in which the prism, e.g. 53, and the air space, e.g. 29a, both come to a point. The assembly is field widened across the aperture, but at the right edge, the path is exclusively in air, and at the left edge, the path is exclusively in glass. For field widening, the image path length is constant, but the phase difference is varying across the width of the arm.

The SHS 61 may have greater than 1.5×, but less than 2×, the spectral resolution of the SHS 21 or 41. Some of beam paths from the first diffraction grating 28a are identical to those from the second diffraction grating 28b, i.e. the shortest path length to the second (farther) diffraction grating 28b is shorter than the longest path length to the first (closer) diffraction grating 28b, which means there is a zero path element in the fringe pattern displayed on the camera 34, which enables extraction of a full spectrum from the Fourier transform by controller 40. However, because the zero path condition is off center, a wider range of path differences may be evaluated compared to the symmetric configuration—thus nearly doubling the resolution without affecting the range of wavelengths which may be evaluated. Alternately, for a given resolution, the range could be doubled compared to a symmetric design. This configuration requires a slightly different math approach because the fringe pattern is not symmetric. For the SHS 21 or 41, as in FIGS. 2 and 5, the position of the imaging camera 34 may be offset from the centerline of the SHS 21 or 41 to achieve the same result.

Figure 7:
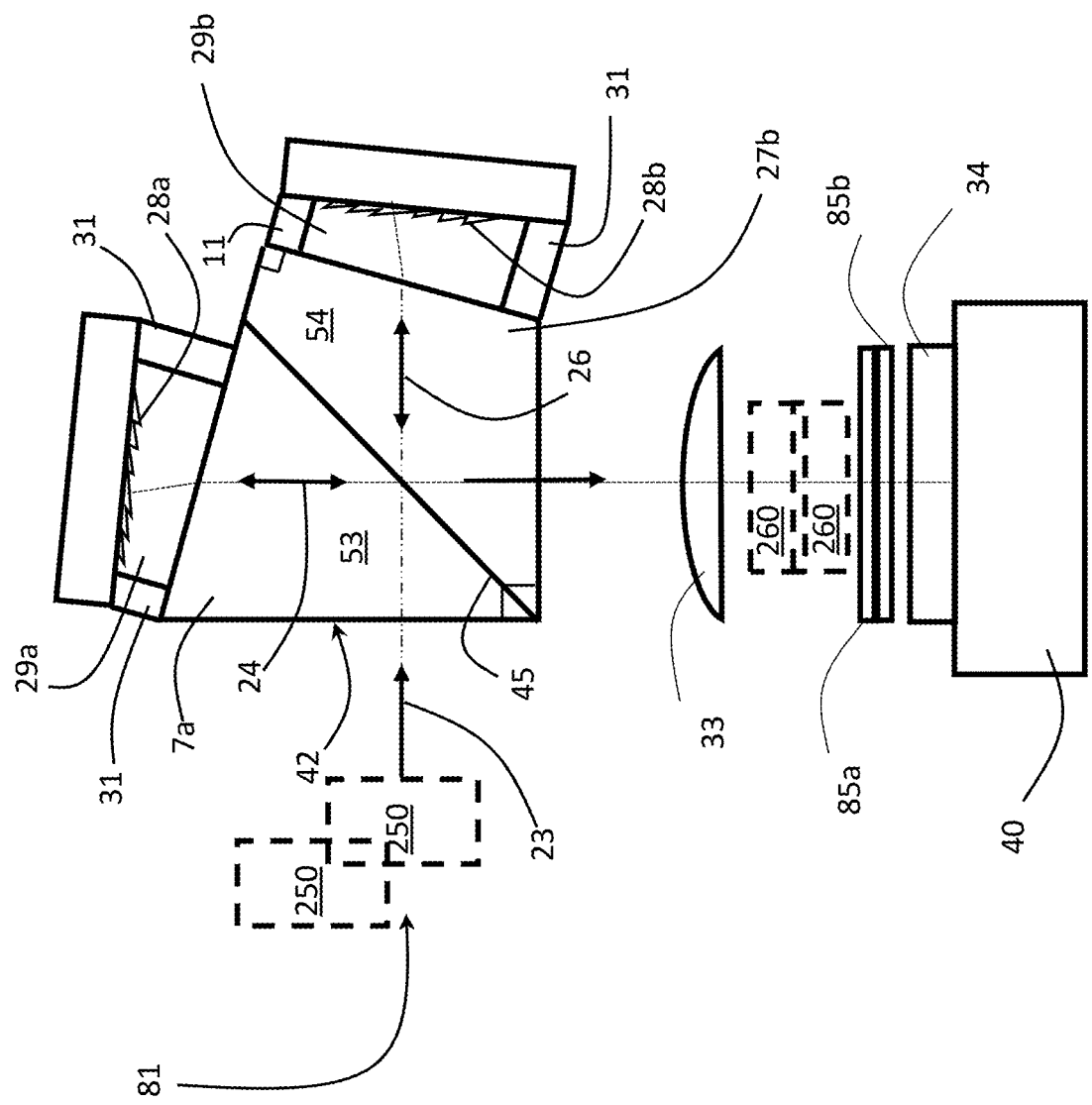
FIG. 7 is a schematic diagram of an SHS including wavelength filtering in accordance with another embodiment of the present invention.

With reference to FIG. 7, an SHS 81, which comprises a similar structure to SHS 1, SHS 21 or SHS 41, and could even be utilized without field widening prisms, extends the wavelength range while maintaining the same resolution, by dividing the fringe pattern into two or more horizontal bands, and using a different bandpass filter 85a and 85b for each band. In particular, since the SHS spectrometers may generate fringe patterns for wavelengths spaced both above and below the heterodyne (Littrow) wavelength, the controller 40 may have difficulty differentiating between them because the fringe patterns look the same whether the wavelength is above or below the heterodyne wavelength. In the simplest case, the band pass filters 85a and 85b remove the ambiguity between wavelengths above and below the heterodyne wavelength by filtering out one or the other, see FIG. 8. Each filter 85a and 85b should cover the full width of the grating 28a, but only cover approximately half the height.

Figure 8:
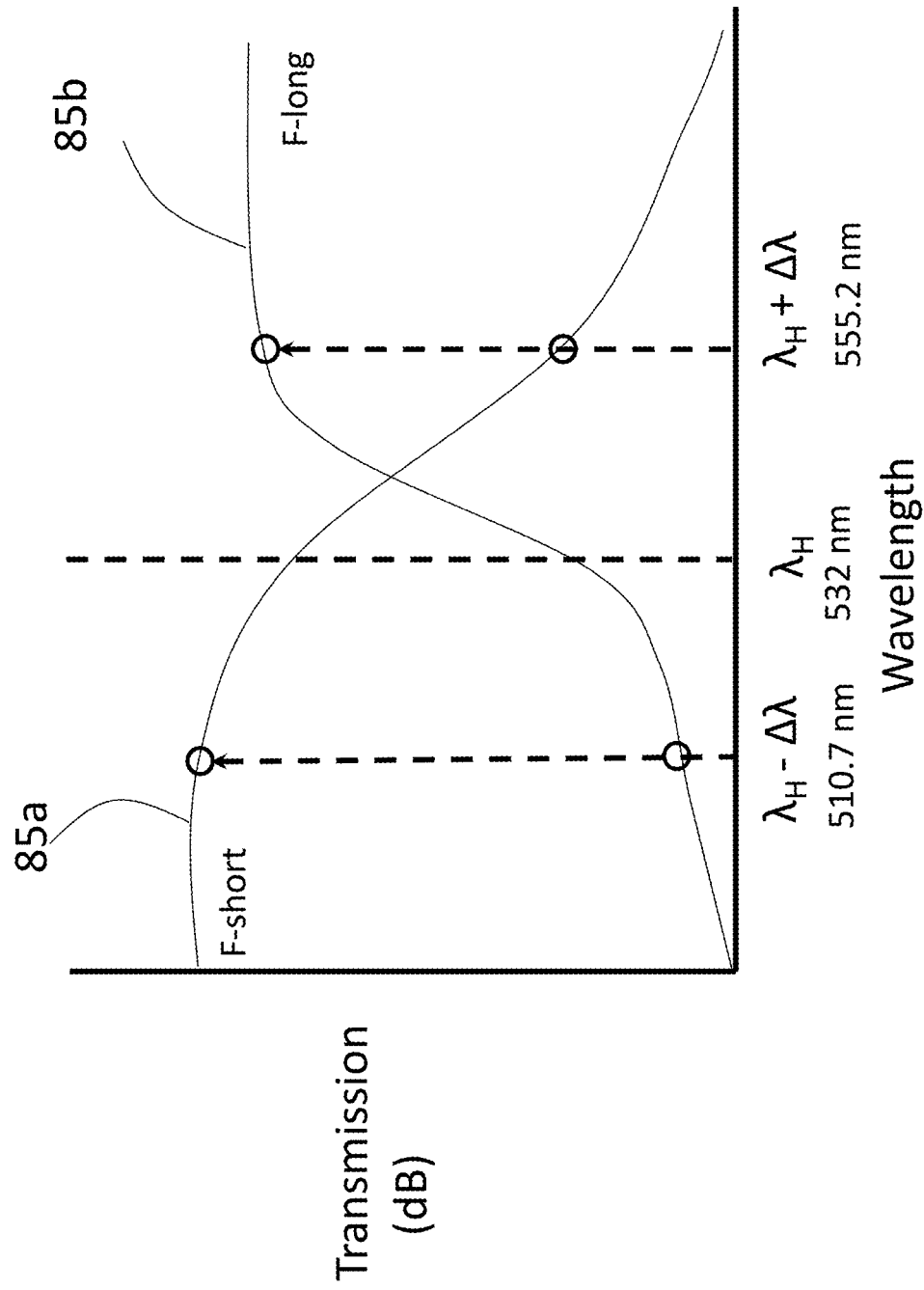
FIG. 8 illustrates a graph of wavelength vs intensity for the SHS of FIG. 7 including passband filters above and below the heterodyne wavelength.

FIG. 8 illustrates how the intensity at a given fringe frequency is determined by the intensity at two different wavelengths and the two different filter functions. If the two filter functions have the same value at the heterodyne wavelength (or even close to the heterodyne wavelength, e.g. within 10× the resolution limit of the SHS) wavelengths near the heterodyne wavelength will not be resolvable, because the system of equations will be degenerate for those wavelengths, at least once allowance is made for noise.

In particular for wavelengths close to the heterodyne wavelength, the filters 85a and 85b should meet two primary conditions to eliminate ambiguity about the location of input wavelengths relative to the heterodyne wavelength. The transmission of the two filters 85a and 85b should not be the same at the heterodyne wavelength, and at least one of the filters should not have local mirror symmetry around the heterodyne wavelength. Provided these two conditions are met, the actual intensities of the input wavelengths can be determined by solving the linear equations for each pair of wavelengths equidistant from the heterodyne wavelength. For example, if the heterodyne wavelength is 532 nm, then wavelengths 510.7 nm and 555.2 nm, resulting in symmetrical frequencies, will produce the same number of fringes on the camera 34. The measured intensity $S_1$ recorded on the short wavelength side of the heterodyne wavelength will be:

$S_1 = F\text{short}_{510.7} * I_{510.7} + F\text{short}_{555.2} * I_{555.2}$, when there is no light at 555.2 nm the second term is 0;

and the measured intensity recorded on the long wavelength side of the heterodyne wavelength will be:

$S_2 = F\text{long}_{510.7} * I_{510.7} + F\text{long}_{555.2} * I_{555.2}$, when there is no light at 510.7 nm the first term is 0;

where $F\text{long}_{555.2}$ is the transmission function of the long wavelength filter at 555.2 nm. Determining $I_{510.7}$ and $I_{555.2}$ requires the controller 40 solving the pair of equations above. A similar set of matrix calculations is needed for each pair of wavelengths.

Either a unique filter 85a and 85b could be inserted in each portion covering the short wavelength limit to the heterodyne wavelength in one section of the pixels on the camera 34, and covering the heterodyne wavelength to the long wavelength limit in the other section. This configuration allows separation of the two ranges with two separate one-dimensional Fourier transforms. Alternatively, if the fringes are tilted, and there filtering is the same across the full instrument aperture, a spectrum covering the full range of the instrument can be extracted using a two dimensional Fourier transform. The drawback of the two dimension Fourier transform is that vertical binning of the fringe pattern on the camera (as a noise control strategy) cannot be performed.

Alternatively only a single filter 85a covering one section may be used, and then the controller 40 mathematically subtracts the filtered component from the other part of the field. This idea can be extended with overtone bands to deliberately look at aliased signals. In this case, the spacing between intensity maxima of the fringe pattern is less than two detector pixels; so, the fringe pattern is under-sampled and appears as a lower frequency and a DC level—this is called aliasing. The aliased signals are not as valuable because there is a large DC component in the signal, but there is still information available in the fringe pattern if you know that it has been aliased. In this configuration, you could have 4 horizontal bands each with its own band pass filter corresponding to long wavelength band (aliased), long wavelength band (non-aliased), short wavelength band (non-aliased), short wavelength band (aliased). Higher bands would be possible, but it does get difficult to collect all of the light as the diffracted angles increase.

There are some restrictions on the performance of the band pass filters 85a and 85b, see FIG. 8. At least one of the bandpass filters 85a and 85b must not have any mirror symmetry about the heterodyne wavelength $\lambda_L$. Ideally, the bandpass filters 85a and 85b should have a steep roll off, because of reduced influence to noise, and the pass band transmission should be as high as possible while the out of band blocking, especially for signals beyond the short and long wavelength Nyquist limits, should be as good as possible.

Figure 9:
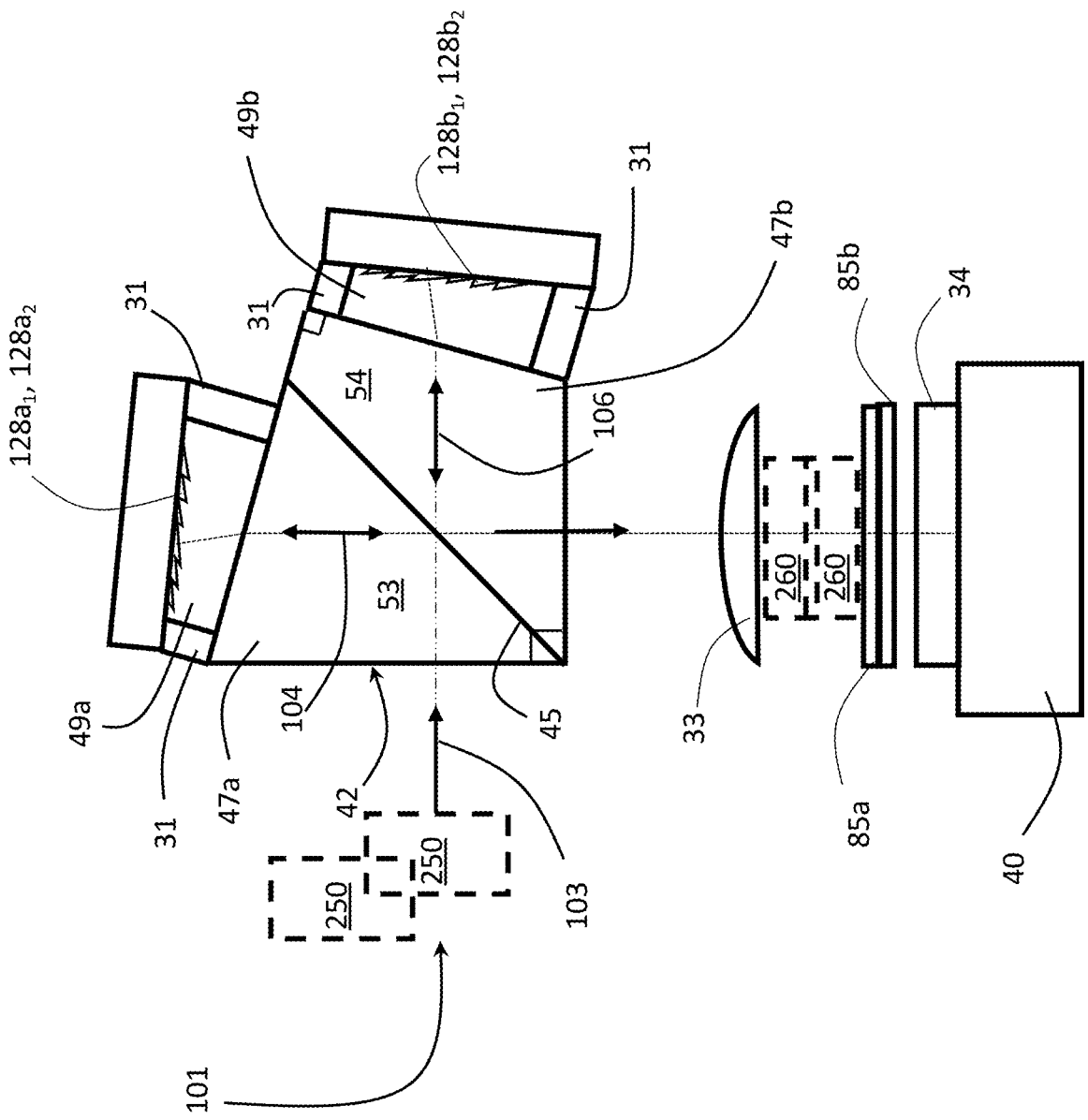
FIG. 9 is a schematic diagram of an SHS including multi-diffraction gratings in accordance with another embodiment of the present invention.
Figure 10:
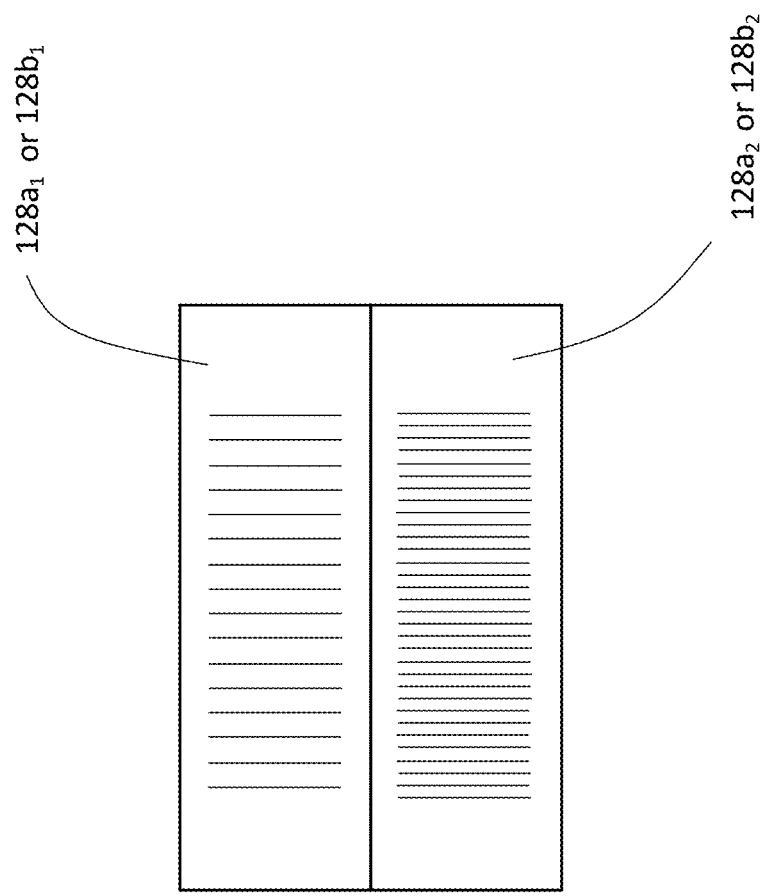
FIG. 10 illustrates the dual diffraction gratings of the SHS of FIG. 9.

With reference to FIGS. 9 and 10, an SHS 101, which may comprise a similar structure to SHS 1 SHS 21, SHS 41, SHS 61 or SHS 81, all with or without field widening prisms, extends the wavelength range while maintaining the same resolution. The SHS 101 includes a plurality of, e.g. two, different diffraction gratings $128a_1$ and $128a_2$ adjacent each other in one arm, and two different diffraction gratings $128b_1$ and $128b_2$ adjacent each other in the second arm, wherein diffraction gratings $128a_1$ and $128b_1$ are substantially the same, and diffraction gratings $128a_2$ and $128b_2$ are substantially the same. Each set of diffraction gratings $128a_1$ and $128a_2$, and $128b_1$ and $128b_2$ designed to diffract a different wavelength range, each at least 100 nm wide, e.g. at least 500 nm to 750 nm, and at least 750 nm to 900 nm. Accordingly, the beam splitter 22 or 42 separates an input beam of light 103 into first and second sub-beams 104 and 106, each diffracted back to the beam splitter 22 or 42 in different wavelength bands based on two different Littrow wavelengths $\lambda_{L1}$ and $\lambda_{L2}$, i.e. a different band per diffraction grating pair. As long as the product of the groove density (d) and the heterodyne (Littrow) wavelength ($\lambda_L$) is constant, the desired angle for each grating $128a_1$, $128b_1$, $128a_2$ and $128b_2$ may be the same, i.e. all of the diffraction gratings, e.g. $128a_1$ and $128a_2$, may be mounted/formed on the same substrate. The grating equation shows why this is.

$$\sin(\theta i) - \sin(\theta o) = m\lambda/d \quad (1)$$

At the Littrow condition the input and output angles are the same, and the equation simplifies (for first order diffraction) to:

$$\sin(\theta_L) = \lambda/(2d) \quad (2)$$

Accordingly, if $\lambda/d$ is constant, the Littrow angle will be the same for all of the gratings, e.g. grating $128a_1$, $128b_1$, $128a_2$ and $128b_2$. Since the grating groove density is $1/d$, selecting the product of wavelength and groove density determines the Littrow angle for the gratings $128a_1$, $128b_1$, $128a_2$ and $128b_2$. Alternatively, for a given angle, a grating groove density may be selected to provide suitable heterodyne wavelengths, or for desired heterodyne wavelengths, the required groove densities may be calculated. Mathematically, all of the above are effectively the same, but once one wavelength/grating pair has been chosen, the Littrow angle is fixed.

Figure 11:
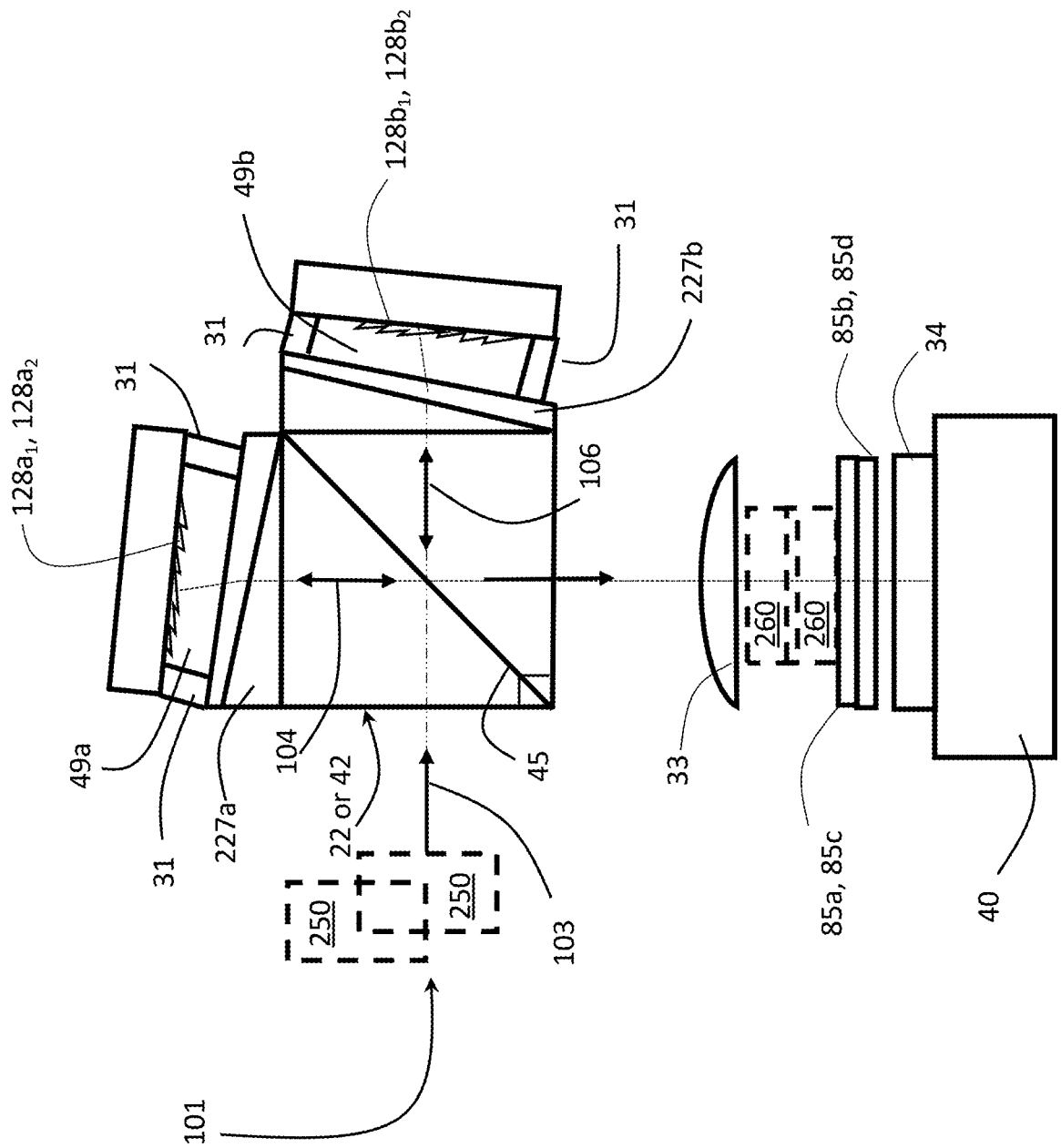
FIG. 11 is a schematic diagram of an SHS including achromatic field widening prisms in accordance with another embodiment of the present invention.

In this configuration without field widening prisms, e.g. 27a and 27b or 47a and 47b, there is no compromise in the performance of either grating section, because the only dispersive element in each arm is the diffraction grating $128a_1$, $128b_1$, $128a_2$ and $128b_2$. However, in field widened configurations, the field widening prisms, e.g. 27a and 27b or 47a and 47b, are bound to have dispersion, so their field widening performance will not necessarily be optimized for all wavelengths. Accordingly, with multiple gratings, using achromatic field widening prisms 227a and 227b, as in FIG. 11, becomes desirable. Each achromatic prism 227a and 227b comprises two different types of material, e.g. glass, with two different refractive indexes, e.g. a first prism of SF11 with a second prism of lower refractive index material BK7 allows the dispersion of the achromatic prisms 227a and 227b to be the same at the two different predetermined wavelengths in the two different wavelength ranges diffracted by the two different diffraction gratings, e.g. 128$a_1$ and 128$a_2$. The predetermined same-dispersion wavelengths may be the Littrow or heterodyne wavelengths for each grating 128$a_1$, 128$b_1$, 128$a_2$ and 128$b_2$ or some other suitable wavelength, e.g. proximate the center of the wavelength range. The first type of material may be the same as the beam splitter 22 or 42, and may be a monolithic structure, while the second type of material may comprise a different type of material fixed to the monolithic structure. Ideally, the two design wavelengths, i.e. with the same dispersion, one in each wavelength range, for the prisms 227$a$ and 227$b$ may be the same as the two different heterodyne wavelengths, but they don't need to be identical, and optimizing the prism design may result in shifts between the two conditions.

When multiple gratings, e.g. 128$a_1$, 128$b_1$, 128$a_2$ and 128$b_2$, are used in the SHS 101, the recombined beam of light including the plurality of bands, may be divided into individual constituent bands, e.g. two or four, with appropriate bandpass filters, e.g. 85$a$, 85$b$, 85$c$ and 85$d$, to enable detection of wavelength components on both sides of each heterodyne wavelength $\lambda_{L1}$ and $\lambda_{L2}$.

Although it is simplest if the tilt angle for each grating 128$a_1$, 128$b_1$, 128$a_2$ and 128$b_2$ is identical, it's not necessary. Individual gratings have very slight tilts relative to their substrates, and it could be beneficial to deliberately tilt one grating relative to the other to fine tune the wavelength range, or because the precise grating combinations are not practically available. Band pass filters would still be needed for each horizontal section of the output. This idea can be extended to three or more diffraction gratings. It is possible to follow this path even if the groove density and heterodyne wavelength products are not constant for all of the different gratings, but then the assembly is complicated because of the need to change the tilt angle for one or more of the gratings. An extension of this idea is to use a single low density grating on each arm, but to then use different diffraction orders (2, 3, 4 or more) for each horizontal band.

Figure 13:
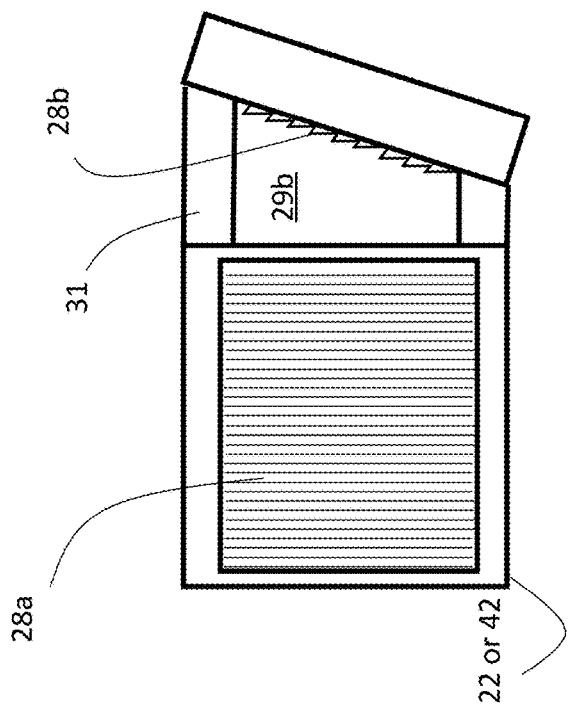
FIG. 13 is a side view of an SHS with substantially different gratings.
Figure 12:
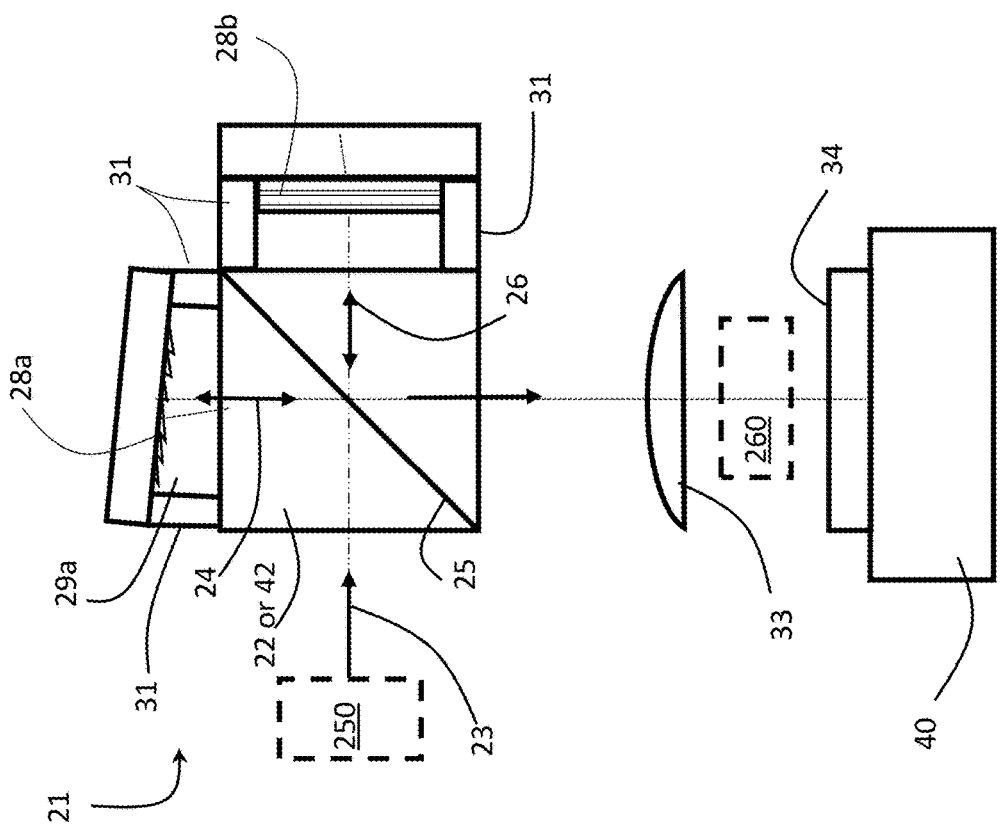
FIG. 12 is a top view of an SHS with substantially different gratings.

With reference to FIGS. 12 and 13, the aforementioned SHS embodiments may use two identical gratings in each arm, e.g. 300 l/mm to 1200 l/mm, or in some embodiments may include slightly different gratings in each arm, e.g. 25% to 2× the l/mm, more preferably 50% to 1.5×, or more specifically 500 l/mm and 750 l/mm. However, according to other embodiments, a grating may be used for one arm, and a flat mirror may be used in the other arm. Another possible method to extend the range of an SHS beyond what is conventionally possible is to construct an SHS with very different gratings, e.g. greater than 20× the blaze angle, and preferably greater than 50× the blaze angle for the same groove density or greater than 10× the groove depth, and preferably greater than 20× the groove depth for the same blaze angle and groove density, resulting in a heterodyne wavelength of one arm at least 20× greater than the other, preferably 50× greater than the other, more preferably greater than 100× greater than the other. For example, in one arm a grating with a groove density of 30 l/mm and a blaze angle of 0.09°, resulting in an effective heterodyne wavelength of 53 nm, and in the other arm a grating with a groove density of 30 l/mm and a blaze angle of 6.9°, resulting in a heterodyne wavelength of 8000 nm. The second grating may be rotated so that its dispersion direction is perpendicular, e.g. vertical, compared to the, e.g. horizontal, dispersion of the first grating. This configuration results in a checkerboard of path differences rather than stripes, and allows sampling of larger number of path differences.

Alternately, the very shallow grating could be replaced with a tilted mirror (in the example above tilted at 0.09° to give the same average rate of path difference change per millimeter of mirror width. This configuration has the advantage that the change in path length between detector elements can be more smoothly varying. If the heterodyne wavelengths of the two gratings are not a rational multiple (e.g. 150 or 137 or 440/3) extracting the spectrum becomes more challenging because the spacing of the path differences is not uniform, but for the tilted mirror, the "step" between pixels could be reduced by a factor of 3-10.

Using a substantially square detector array, e.g. 2048× 2000 pixels or 1320×1024 pixels for the camera 34, may not be possible or desirable for noise reasons. For instance, weak illuminating signals when spread out over a large number of pixels in the non-dispersive direction will contribute extra detector read out noise, which can be mitigated by averaging across rows after reading the fringe image. In other situations, the only suitable detector array, e.g. Single Photon Avalanche Diode (SPAD), arrays for the camera 34 are only available in highly elongated arrays like 2048×8. However, in both of these situations, adding a cylindrical focus element or lens 250 prior to the beam splitter 22, 42 or 62 will improve the light collection efficiency. The cylindrical focus element 250 enables only an elongated, i.e. highly elliptical or rectangular, area on the gratings 28$a$ and 28$b$ or 128$a_1$, 128$a_2$, 128$b_1$ and 128$b_2$ is illuminated by the incoming beam of light 23 or 103. Alternatively or in addition, using a cylindrical focus element 260 after the beam splitter 22, 42 or 62 compresses the fringe image at the detector plane to an elongated area to reduce the number of pixels of the camera 34 illuminated with the same signal, thus reducing the readout noise, or in the case of a substantially rectangular array collecting a higher portion of the available pixels.

Adding the cylinder lens 250 before the beam splitter 22, 42 or 62 is simpler because it will have less effect on the fringe imaging lens system, i.e. lens 33, but in this location increases the need for field widening. If the SHS is not field widened, the cylindrical lens element 250 may be combined with the fringe imaging lens system 33 to limit the number of rows illuminated on the detector array of the camera 34. In either case, the addition of the cylinder lens 250 greatly reduces the ability to evaluate the input spectrum from different points in the observed scene. Note that the cylindrical lens idea may be extended to each field of the SHS, i.e. if there are two apertures, e.g. a long wavelength and a short wavelength, created by filters 85$a$ and 85$b$ the cylindrical lenses 250 and/or 260 may be added in the path of each range of wavelengths, as in FIGS. 7, 9 and 11.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A spatial heterodyne spectrometer (SHS) comprising:
   an input for launching an input beam of light;
   a beam splitter for separating the input beam of light into first and second sub-beams, and directing the first and second sub-beams along first and second paths, respectively;
   a first field-widening prism in the first path for deflecting the first sub-beam;
   a second field-widening prism in the second path for deflecting the second sub-beam;

a first diffraction grating in the first path for diffracting the first sub-beam into constituent wavelengths, each travelling back to the beam splitter at a different angle;

a second diffraction grating in the second path for diffracting the second sub-beam into the constituent wavelengths, each travelling back to the beam splitter at a different angle;

a camera for recording a fringe pattern created by interference of the first and second diffracted sub-beams; and a controller for determining a spectrum of the input beam from the fringe pattern;

wherein the first and second diffraction gratings include a same Littrow wavelength providing a heterodyne wavelength creating a zero-path element within the fringe pattern;

wherein a first portion of the beam splitter and the first field widening prism comprise a first monolithic structure;

wherein a second portion of the beam splitter and the second field widening prism comprise a second monolithic structure; and wherein the first and second monolithic structures are connected along a partially reflective surface forming an integrated non-cubic block.

2. The SHS according to claim 1, wherein the first and second prisms are mounted directly on the beam splitter.

3. The SHS according to claim 1, wherein the second monolithic structure includes perpendicular surfaces forming a right angle at a first edge; and wherein the first and second monolithic structures include perpendicular surfaces forming a right angle at a second edge, opposite the first edge.

4. The SHS according to claim 1, wherein an average optical path length of the first path is longer than an average optical path length of the second path.

5. The SHS according to claim 4, wherein a shortest optical path length to the first grating is shorter than a longest optical path length to the second grating, whereby a zero-path element is within the fringe pattern.

6. The SHS according to claim 1, further comprising a first band pass filter for filtering out wavelengths above the heterodyne wavelength in a first section of the camera.

7. The SHS according to claim 6, further comprising a second band pass filter for filtering out wavelengths below the heterodyne wavelength in a second section of the camera.

8. The SHS according to claim 1, wherein the first diffraction grating comprises a plurality of gratings, each of the plurality of gratings for diffracting a different wavelength range including a different heterodyne wavelength.

9. The SHS according to claim 8, wherein a product of groove density and the heterodyne wavelength are constant for each of the plurality of gratings resulting in a substantially same Littrow angle for each of the plurality of gratings, whereby a desired tilt angle for each of the plurality of gratings will be substantially the same.

10. The SHS according to claim 8, wherein the first field-widening prism comprises a first achromatic prism, and the second field-widening prism comprises a second achromatic prism, whereby an angle of refraction of the first and second achromatic prisms is the same at different predetermined wavelengths, one predetermined wavelength within each of the wavelength ranges.

11. The SHS according to claim 10, wherein the different predetermined wavelengths comprise the different heterodyne wavelengths.

12. The SHS according to claim 10, wherein each of the first and second achromatic prisms comprise a first material substantially the same as the beam splitter, and a second material including a different refractive index than the first material.

13. The SHS according to claim 12, wherein the first material of the first achromatic prism forms the monolithic structure with the first portion of the beam splitter; and wherein the first material of the second achromatic prism forms the monolithic structure with the second portion of the beam splitter.

14. The SHS according to claim 8, further comprising:
a first band pass filter for filtering out wavelengths above a first heterodyne wavelength in a first section of the camera;

a second band pass filter for filtering out wavelengths below the first heterodyne wavelength in a second section of the camera;

a third band pass filter for filtering out wavelengths above a second of the heterodyne wavelengths in a third section of the camera; and a fourth band pass filter for filtering out wavelengths below the second heterodyne wavelength in a fourth section of the camera.

15. The SHS according to claim 1, further comprising a cylindrical focus element for focusing the input beam of light, whereby only an elongated elliptical or rectangular area on each of the first and second diffraction gratings is illuminated.

16. The SHS according to claim 1, further comprising a cylindrical focus element for compressing the fringe pattern on the camera to an elongated area to reduce a number of pixels on the camera illuminated, thereby reducing readout noise or collecting a higher portion of available pixels.

17. A spatial heterodyne spectrometer (SHS) comprising:
an input for launching an input beam of light;
a beam splitter for separating the input beam of light into first and second sub-beams, and directing the first and second sub-beams along first and second paths, respectively;
a first field-widening prism in the first path for deflecting the first sub-beam;
a second field-widening prism in the second path for deflecting the second sub-beam;
a first diffraction grating in the first path for diffracting the first sub-beam into constituent wavelengths, each travelling back to the beam splitter at a different angle;
a second diffraction grating in the second path for diffracting the second sub-beam into the constituent wavelengths, each travelling back to the beam splitter at a different angle;
a camera for recording a fringe pattern created by interference of the first and second diffracted sub-beams; and
a controller for determining a spectrum of the input beam from the fringe pattern;
wherein the first and second diffraction gratings include a same Littrow wavelength providing a heterodyne wavelength creating a zero-path element within the fringe pattern;
wherein a first average optical path length of the first path is longer than a second average optical path length of the second path;
wherein the first field-widening prism includes a wider thickness than the second prism providing the longer first average optical path length of the first path; and wherein the optical path lengths to the first grating and to the second grating, which correspond to a zero path difference, includes a same ratio of air to glass, and a same total thickness.

18. The SHS according to claim 17, wherein a first portion of the beam splitter and the first field widening prism comprise a first monolithic structure;

wherein a second portion of the beam splitter and the second field widening prism comprise a second monolithic structure; and wherein the first and second monolithic structures are connected along a partially reflective surface forming an integrated non-cubic block.

19. A spatial heterodyne spectrometer (SHS) comprising:

an input for launching an input beam of light;

a beam splitter for separating the input beam of light into first and second sub-beams, and directing the first and second sub-beams along first and second paths, respectively;

a first field-widening prism in the first path for deflecting the first sub-beam;

a second field-widening prism in the second path for deflecting the second sub-beam;

a first diffraction grating in the first path for diffracting the first sub-beam into constituent wavelengths, each travelling back to the beam splitter at a different angle;

a second diffraction grating in the second path for diffracting the second sub-beam into the constituent wavelengths, each travelling back to the beam splitter at a different angle;

a camera for recording a fringe pattern created by interference of the first and second diffracted sub-beams; and a controller for determining a spectrum of the input beam from the fringe pattern;

wherein the first and second diffraction gratings include a same Littrow wavelength providing a heterodyne wavelength creating a zero-path element within the fringe pattern;

wherein the first diffraction grating includes a first groove depth at least 10× greater than a second groove depth of the second diffraction grating.

20. The SHS according to claim 19, wherein the second diffraction grating is at an angle relative to the first diffraction grating, whereby a dispersion direction of the second diffraction grating is perpendicular to a dispersion direction of the first diffraction grating.

\* \* \* \* \*